United States Patent
Hasegawa

(10) Patent No.: US 12,072,527 B2
(45) Date of Patent: Aug. 27, 2024

(54) SENSING CABLE AND SENSING SYSTEM

(71) Applicant: FURUKAWA ELECTRIC CO., LTD., Tokyo (JP)

(72) Inventor: Hideaki Hasegawa, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 22 days.

(21) Appl. No.: 18/047,840

(22) Filed: Oct. 19, 2022

(65) Prior Publication Data

US 2023/0161102 A1   May 25, 2023

(30) Foreign Application Priority Data

Oct. 22, 2021   (JP) .................................. 2021-172829

(51) Int. Cl.
*G02B 6/12* (2006.01)
*G02B 6/02* (2006.01)
*G02B 6/44* (2006.01)

(52) U.S. Cl.
CPC ..... *G02B 6/12028* (2013.01); *G02B 6/02104* (2013.01); *G02B 6/02395* (2013.01); *G02B 6/12016* (2013.01); *G02B 6/443* (2013.01); *G02B 2006/12069* (2013.01); *G02B 2006/1209* (2013.01); *G02B 2006/12138* (2013.01)

(58) Field of Classification Search
CPC ...... G02B 6/12016; G02B 2006/12138; G02B 2006/2839
See application file for complete search history.

(56) References Cited

U.S. PATENT DOCUMENTS

| 4,277,272 | A | * | 7/1981 | Schneider | ............. | C03B 37/028 |
| | | | | | | 427/237 |
| 5,144,690 | A | | 9/1992 | Domash | | |
| 6,563,987 | B1 | * | 5/2003 | Takahashi | ............ | G02B 6/3594 |
| | | | | | | 385/24 |
| 2004/0052444 | A1 | * | 3/2004 | Moslehi | ............. | G01D 5/35316 |
| | | | | | | 385/13 |

FOREIGN PATENT DOCUMENTS

| CA | 2307468 A1 * | 11/2000 | ............. G01G 3/125 |
| JP | 4-307328 A | 10/1992 | |
| JP | 0756048 A * | 3/1995 | |

OTHER PUBLICATIONS

JP0756048A English translation (Year: 1995).*

* cited by examiner

*Primary Examiner* — Charlie Y Peng
(74) *Attorney, Agent, or Firm* — Oblon, McClelland, Maier & Neustadt, L.L.P.

(57) ABSTRACT

A sensing cable includes a first optical fiber, a second optical fiber that extends along the first optical fiber and that is spaced from the first optical fiber, and a transmitting material that includes an intervention portion present between the first optical fiber and the second optical fiber, the transmitting material being configured to transmit light from the first optical fiber to the second optical fiber through the intervention portion.

22 Claims, 7 Drawing Sheets

SENSING CABLE AND SENSING SYSTEM

CROSS-REFERENCE TO RELATED APPLICATION(S)

This application claims the benefit of priority from Japanese Patent Application No. 2021-172829 filed on Oct. 22, 2021, the entire contents of which are incorporated herein by reference.

BACKGROUND

1. Technical Field

The present disclosure relates to a sensing cable and a sensing system.

2. Related Art

Sensing systems that are equipped with a sensing cable including a multi-core optical fiber having a first core, a second core, and a cladding, and that detects a physical quantity, such as pressure, based on crosstalk between the first core and the second core have conventionally been known (JP-A-4-307328).

In the sensing cable of JP-A-4-307328, when light coupling to the second core from the first core is to be induced, it is necessary to reduce the optical confinement effect in the first core and, consequently, light leaking from the first core to the cladding propagates across the surrounding of the first core. Accordingly, a rate of an optical power coupled in the second core to an optical power leaked from the first core becomes low and, for example, problems such as lowered detection sensitivity or lowered energy efficiency have occurred in some cases.

Therefore, an object of the present disclosure is to obtain improved novel sensing cable and sensing system that are capable of improving, for example, the detection sensitivity and the energy efficiency.

SUMMARY

A sensing cable according to one aspect of the present disclosure includes a first optical fiber; a second optical fiber that extends along the first optical fiber and that is spaced from the first optical fiber; and a transmitting material including an intervention portion present between the first optical fiber and the second optical fiber, the transmitting material being configured to transmit light from the first optical fiber to the second optical fiber through the intervention portion. On a cross-section intersecting a longitudinal direction of the first optical fiber at a position at which the intervention portion is arranged, an outer periphery of the first optical fiber includes a first section and a second section, the first section being in contact with the intervention portion and being optically connected to the intervention portion, the second section being separated from the intervention portion.

A sensing cable according to one aspect of the present disclosure includes a first optical fiber; a second optical fiber that extends along the first optical fiber and that is spaced from the first optical fiber; a transmitting material including an intervention portion present between the first optical fiber and the second optical fiber, the transmitting material being configured to transmit light from the first optical fiber to the second optical fiber through the intervention portion; and a suppression material configured to suppress travel of light from the first optical fiber to a direction deviated from the intervention portion on an outer periphery of the first optical fiber.

A sensing system according to one aspect of the present disclosure includes: a light source; the sensing cable; and a measurement device configured to measure at least one of an external force acting on the sensing cable and a state change of the sensing cable based on inspection light, the inspection light being input to the first optical fiber from the light source and being output from the second optical fiber through the transmitting material.

The above and other features, advantages and technical and industrial significance of this disclosure will be better understood by reading the following detailed description, when considered in connection with the accompanying drawings.

DETAILED DESCRIPTION

Hereinafter, exemplary embodiments of the present disclosure will be disclosed. Configurations, actions and effects (results) provided by the configurations of the embodiments described in the following are one example. The present disclosure can be implemented by other means than the configurations disclosed in the following embodiments. Moreover, according to the present disclosure, it is possible to obtain at least one of various effects (including secondary effects) that can be obtained by the configuration of the embodiments.

The embodiments described in the following include similar configurations. Therefore, according to the configurations of the respective embodiments, similar actions and effects based on the similar configurations can be obtained. Furthermore, in the following, like reference symbols are assigned to those similar configurations, and duplicated explanation can be omitted.

Moreover, in the present specification, ordinal numbers are used for convenience of distinguishing parts, members, portions, and the like, and are not to indicate priority or order.

First Embodiment

Figure 1:
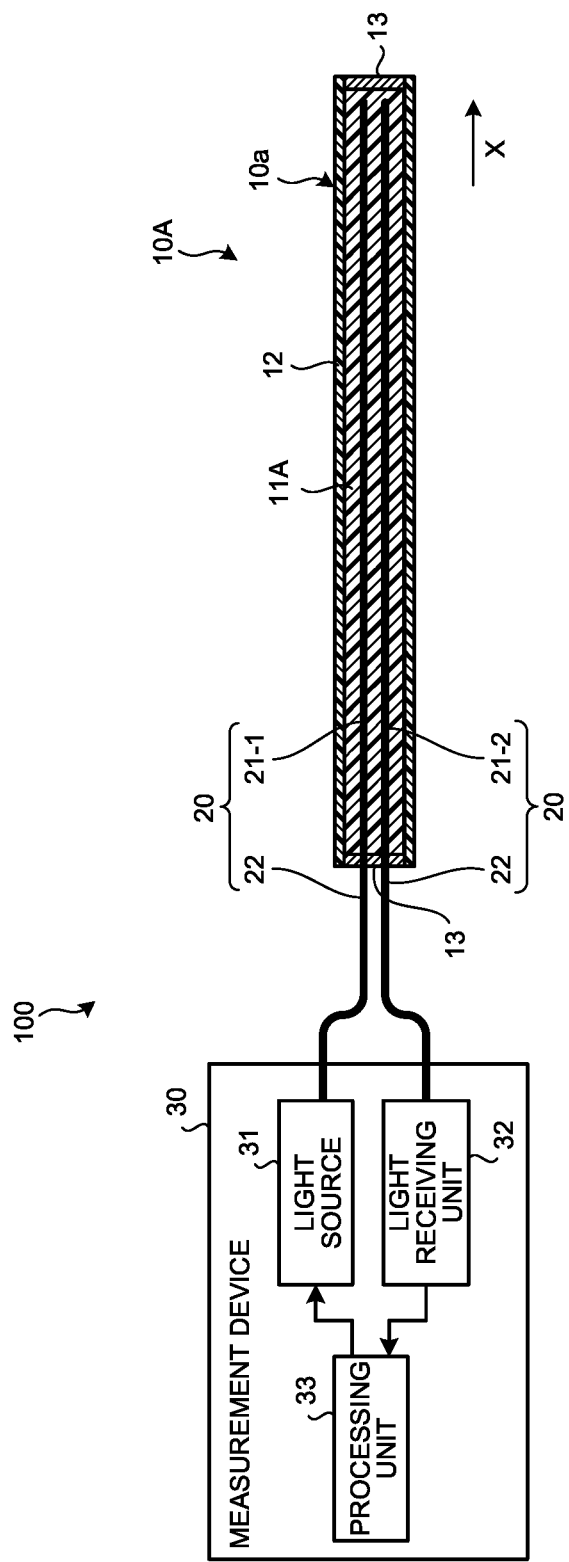
FIG. 1 is an exemplary schematic diagram illustrating a sensing system of a first embodiment.

FIG. 1 is a schematic configuration diagram of a sensing system 100 according to a first embodiment. The sensing system 100 includes a sensing cable 10A, an optical fiber 20, and a measurement device 30. In FIG. 1, as for a measuring unit 10a of the sensing cable 10A, a cross-section taken along a longitudinal direction is illustrated.

The sensing system 100 can measure physical quantities, such as pressure and force acting on the measuring unit 10a of the sensing cable 10A, state changes, such as bend, kink, and compression, of the sensing cable 10A based on an external force acting on the measuring unit 10a, and the like.

The measurement device 30 includes a light source 31, a light receiving unit 32, and a processing unit 33.

The light source 31 has, for example, a laser diode, and outputs light (inspection light) having, for example, a wavelength of 400 nm to 550 nm. The light source 31 may output continuous light, or may output optical pulses of predetermined time interval as the inspection light.

The light receiving unit 32 has, for example, a photodiode, and detects intensity of light input from a delivery optical fiber 22. The light receiving unit 32 can be referred to as detecting unit also.

The processing unit 33 acquires reception light intensity in the light receiving unit 32, and calculates a physical quantity, such as force and pressure according to the reception light intensity, and a state change amount, such as a curvature radius of bend of the sensing cable 10A, a kink angle, a diameter change amount. Moreover, the processing unit 33 switches between emission and stop of emission of the inspection light in the light source 31, and changes an output condition of the inspection light. The processing unit 33 can be referred to as control unit or arithmetic unit also.

In the present embodiment, the light source 31 and the light receiving unit 32 are optically connected to different pieces of the optical fibers 20, respectively.

The optical fiber 20 optically connected to the light source 31 is partially housed inside the measuring unit 10a of the sensing cable 10A at a position apart from the light source 31. The measuring unit 10a is a portion on which an external force acts in the sensing cable 10A. A section housed inside the measuring unit 10a out of the optical fiber 20 connected to the light source 31 is a first optical fiber 21-1. Moreover, out of the optical fiber 20, a section between the first optical fiber 21-1 and the light source 31 is the delivery optical fiber 22. The first optical fiber 21-1 and the delivery optical fiber 22 may be a single optical fiber formed in one piece from the beginning, or may be separate optical fibers connected to each other by fusion or the like.

The optical fiber 20 optically connected to the light receiving unit 32 is partially housed inside the measuring unit 10a at a position apart from the light receiving unit 32. A section housed inside the measuring unit 10a out of the optical fiber 20 is a second optical fiber 21-2. Moreover, out of the optical fiber 20, a section between the second optical fiber 21-2 and the light receiving unit 32 is the delivery optical fiber 22. The second optical fiber 21-2 and the delivery optical fiber 22 may be a single optical fiber formed in one piece from the beginning, or may be separate optical fibers connected to each other by fusion or the like.

Figure 2:
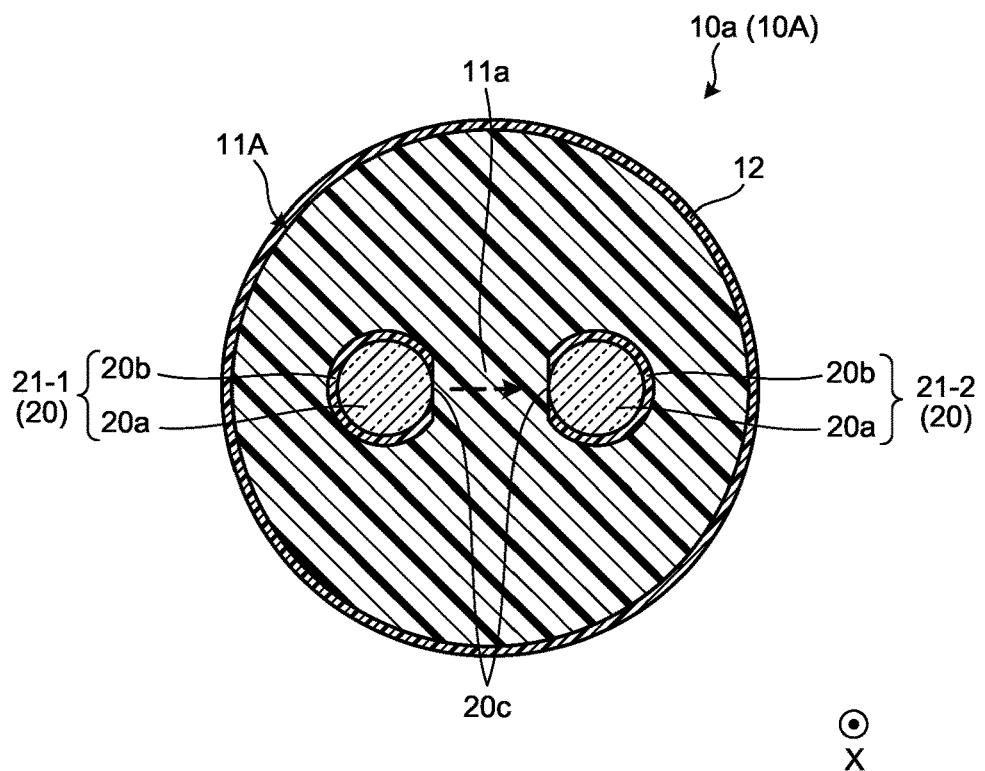
FIG. 2 is an exemplary and schematic cross-section of the sensing system of the first embodiment.

FIG. 2 is a cross-section intersecting with a longitudinal direction of the measuring unit 10a of the sensing cable 10A. As illustrated in FIGS. 1, 2, the first optical fiber 21-1 and the second optical fiber 21-2 both extend substantially parallel in an X direction in the sensing cable 10A and are spaced apart from each other. The X direction is a longitudinal direction of the sensing cable 10A. In the present embodiment, the first optical fiber 21-1 and the second optical fiber 21-2 are separated from each other.

The sensing cable 10A includes a transmitting material 11A, a cover 12, and a plug 13 in addition to the first optical fiber 21-1 and the second optical fiber 21-2.

The transmitting material 11A can transmit the inspection light, and is made, for example, from a synthetic resin material. The transmitting material 11A is arranged so as to surround around the first optical fiber 21-1 and the second optical fiber 21-2, and extends in the X direction. Moreover, the transmitting material 11A includes an intervention portion 11a that is positioned between the first optical fiber 21-1 and the second optical fiber 21-2. The intervention portion 11a also extends in the X direction. The transmitting material 11A is only required to be capable of propagating the inspection light, and it may be, for example, air, water, other liquids, or the like also.

The transmitting material 11A has a substantially circular cross-sectional shape. Moreover, the cover 12 has substantially uniform thickness, and has a tubular shape or a cylindrical shape, and surrounds an outer periphery of the transmitting material 11A. The cover 12 can improve protection of the sensing cable 10A.

Each of the first optical fiber 21-1 and the second optical fiber 21-2 includes a core 20a and a cladding 20b. The core 20a can transmit the inspection light, and is made from, for example, quartz glass in the present embodiment. Furthermore, the cladding 20b is made from, for example, a synthetic resin material. The cladding 20b may be capable of transmitting the inspection light, or may be incapable of transmitting the inspection light. The core 20a may be made from a synthetic resin material transparent to the inspection light, such as methacrylic resin and fluororesin. In this case, both the first optical fiber 21-1 and the second optical fiber 21-2 may be a plastic optical fiber made from a synthetic resin material.

In the present embodiment, the cladding 20b is removed in a portion 20c facing each other, in other words, the portion 20c facing the intervention portion 11a, from the outer periphery of the first optical fiber 21-1 and the second optical fiber 21-2. Thus, the core 20a of the first optical fiber 21-1 and the intervention portion 11a of the transmitting material 11A face or come into contact with each other, and the core 20a of the second optical fiber 21-2 and the intervention portion 11a of the transmitting material 11A face or come into contact with each other, and the core 20a of the first optical fiber 21-1, the intervention portion 11a, and the core 20a of the second optical fiber 21-2 are thus optically connected to one another. The portion 20c can be formed, for example, by mechanical treatment, such as grinding, polishing, and shot blasting, or by chemical treatment, such as etching. Moreover, in the portion 20c, it is not necessary to remove the cladding 20b completely, and the cladding 20b may remain in very thin thickness, or the cladding 20b may remain in a small amount at intervals. The portion 20c can be referred to as removal portion also. Furthermore, the intervention portion 11a can be referred to as light guide portion of inspection light also. The intervention portion is only required to be a medium that propagates a signal light from the first optical fiber 21-1 to the second optical fiber 21-2, and may be, for example, resin, air, water, or the like.

Moreover, the first optical fiber 21-1 and the second optical fiber 21-2 have a structure in which the inspection light is relatively easy to diffuse. As one example, the first optical fiber 21-1 and the second optical fiber 21-2 may include plural nanostructures in the core 20a, or near the interface between the core 20a and the cladding 20b. The nanostructure is, for example, a filler (for example, particles, such as minute particles or cylindrical tubes) or a void (for example, tubes or minute air space), and may include plural kinds of fillers or plural kinds of voids, or may include both a filler and a void. A cross-sectional diameter perpendicular to the longitudinal direction of the sensing cable 10A of the nanostructure is, for example, 100 nm or less. The nanostructure can be referred to as diffusion factor also. Moreover, to facilitate diffusion of the inspection light, in at least one of the first optical fiber 21-1 and the second optical fiber 21-2, a fiber external layer may be roughened after removing the cladding 20b, or the fiber external layer may be roughened without removing the cladding 20b. Moreover, the structure in which the inspection light is easy to diffuse described above may be arranged in at least one of the first optical fiber 21-1 and the second optical fiber 21-2 only at a portion facing the other. This can promote light coupling between the first optical fiber 21-1 and the second optical fiber 21-2 efficiently.

Furthermore, the refractive index of the transmitting material 11A is equal to or higher than the refractive index of the core 20a of the first optical fiber 21-1, and is equal to or lower than the refractive index of the core 20a of the second optical fiber 21-2. The refractive index of the transmitting material 11A may be higher than the refractive index of the core 20a of the first optical fiber 21-1 and less than the refractive index of the core 20a of the second optical fiber 21-2, or may be substantially the same as the refractive index of the core 20a of the first optical fiber 21-1 and the refractive index of the core 20a of the second optical fiber 21-2.

In the configuration as described, when deformation, such as bend, compression, and kink, occurs in the first optical fiber 21-1, or the first optical fiber 21-1 and the second optical fiber 21-2 come closer to each other due to an external force or the like acting on the measuring unit 10a of the sensing cable 10A, light confinement capability of the first optical fiber 21-1 is reduced, or crosstalk between the first optical fiber 21-1 and the second optical fiber 21-2 increases. Consequently, an amount of the inspection light coupled in the second optical fiber 21-2 from the first optical fiber 21-1 through the intervention portion 11a of the transmitting material 11A increases. Thus, the reception light intensity increases in the light receiving unit 32.

Furthermore, when the first optical fiber 21-1 includes a diffusion factor as described above, the amount of light coupled in the second optical fiber 21-2 from the first optical fiber 21-1 through the intervention portion 11a is more likely to increase, and is more sensitively affected by an external force, deformation, and the like.

Therefore, according to the present embodiment, an external force acting on the sensing cable 10A, or a degree of state change of the sensing cable 10A can be measured based on the reception light intensity of the inspection light in the light receiving unit 32. In this process, the processing unit 33 can calculate an external force or a degree of state change corresponding to the reception light intensity in the light receiving unit 32 based on a correlation between a reception light intensity in the light receiving unit 32 and an external force and a degree of state change that has been experimentally acquired in advance.

In the present embodiment, the refractive index of the cladding 20b is set to be lower than the refractive index of the core 20a and the refractive index of the transmitting material 11A. Therefore, the inspection light leaked from the first optical fiber 21-1 is difficult to be transmitted to the transmitting material 11A through the cladding 20b, and is to be mainly coupled in the intervention portion 11a through the portion 20c. That is, the cladding 20b of the first optical fiber 21-1 suppresses leakage of light from the first optical fiber 21-1 in a direction deviating from the intervention portion 11a and the second optical fiber 21-2 on the outer periphery of the first optical fiber 21-1. By the cladding 20b as described, the inspection light leaked from the first optical fiber 21-1 is to be coupled in the intervention portion 11a and the second optical fiber 21-2 more efficiently. The cladding 20b is one example of suppression material.

Moreover, in the configuration described above, it has been found that the first optical fiber 21-1 and the second optical fiber 21-2 are preferable to be a multimode optical fiber that transmits the inspection light at an inspection wavelength in a multimode from the viewpoint of likeliness of leakage of the inspection light to the transmitting material 11A, and eventually, from the viewpoint of improving the inspection sensitivity. Furthermore, from the same viewpoint, it has been found that the first optical fiber 21-1 and the second optical fiber 21-2 are preferable to be configured to have the transmission loss with respect to the inspection light of 0.3 dB/m or more.

Figure 3:
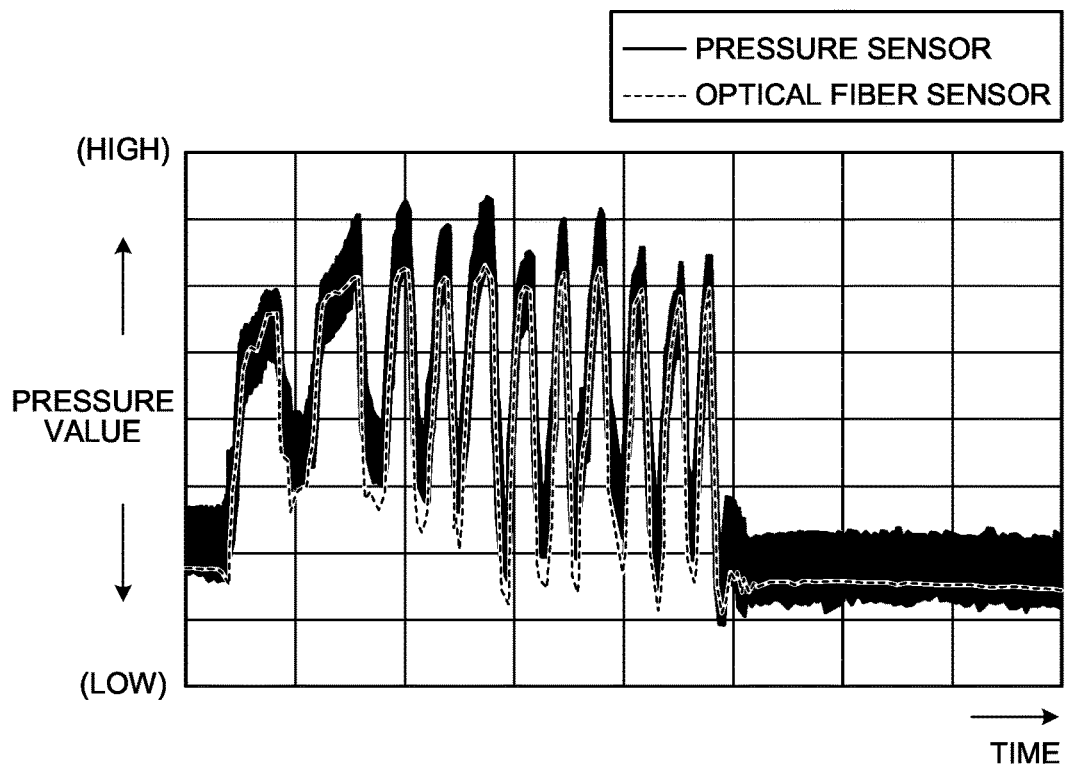
FIG. 3 is a graph showing an example of pressure detection values of the sensing system of the first embodiment and a conventional pressure sensor changing over time.

FIG. 3 is a graph showing an example of pressure detection values of the sensing system 100 of the first embodiment and pressure detection values of a conventional pressure sensor changing over time. This graph shows a result of pressure measurement of a test fluid in an experimental facility. From FIG. 3, it is found that detection values of pressure of the test fluid are preferably in agreement between those of the sensing system 100 of the present embodiment indicated by a broken line and those of the conventional pressure sensor indicated by a solid line. It has experimentally been confirmed that according to the sensing system 100 of the present embodiment, measurement performance equivalent to or higher than the conventional pressure sensor can be obtained as in this example.

As explained above, in the present embodiment, the cladding 20b (suppression material) of the first optical fiber 21-1 suppresses travel of light toward a direction deviating from the intervention portion 11a of the transmitting material 11A from the first optical fiber 21-1.

According to the configuration as described, the inspection light leaked from the first optical fiber 21-1 can be transmitted to the second optical fiber 21-2 efficiently through the intervention portion 11a of the transmitting material 11A, and the detection sensitivity and the energy efficiency can be improved in measurement of an external force and a state change by the sensing system 100.

Second Embodiment

Figure 4:
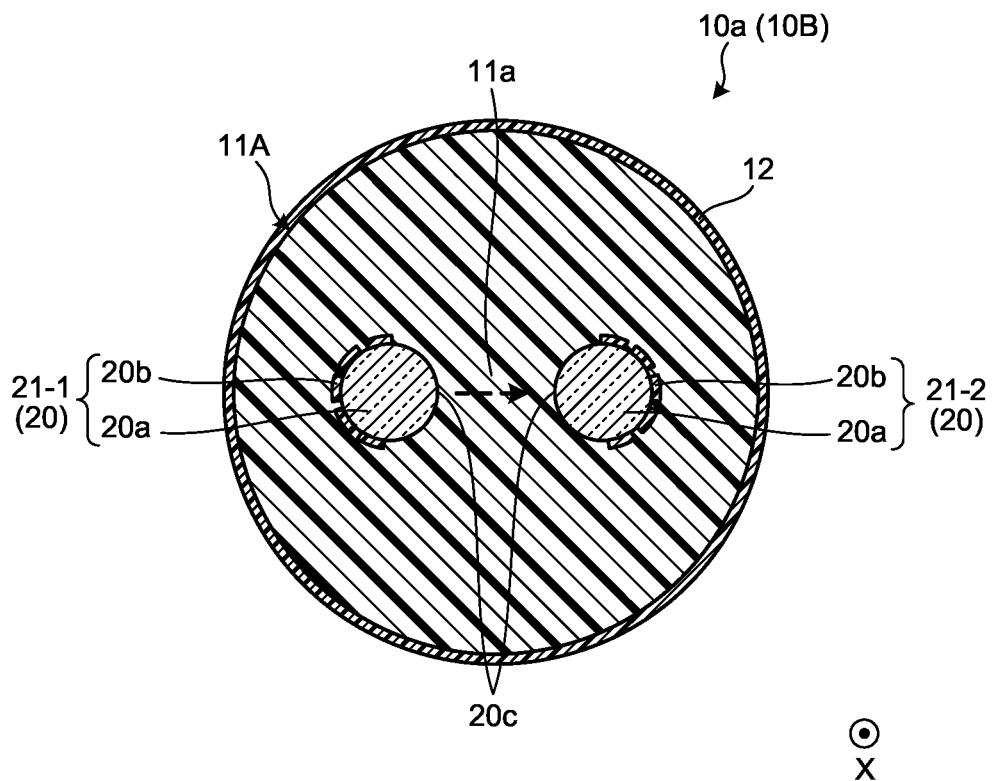
FIG. 4 is an exemplary and schematic cross-section of a sensing cable of a second embodiment.

FIG. 4 is a cross-section intersecting the longitudinal direction of the measuring unit 10a of a sensing cable 10B of a second embodiment. As illustrated in FIG. 4, in the present embodiment, a cladding 20b of the first optical fiber 21-1 and the second optical fiber 21-2 is removed in than a wider range than the first embodiment, and the cladding 20b is formed thinner in an entire area, and is arranged in fragments on an opposite side to the intervention portion 11a. In such a configuration also, the cladding 20b can suppress leakage of light from the first optical fiber 21-1 to the transmitting material 11A, in other words, travel of light from the first optical fiber 21-1 to a direction deviated from the intervention portion 11a in a portion in which the cladding 20b is arranged. Therefore, according to the present embodiment also, the inspection light leaked from the first optical fiber 21-1 can be more efficiently transmitted to the second optical fiber 21-2 through the intervention portion 11a compared to a configuration without the cladding 20b, and the detection sensitivity and the energy efficiency can be improved in measurement of an external force and a state change by the sensing system 100.

Third Embodiment

Figure 5:
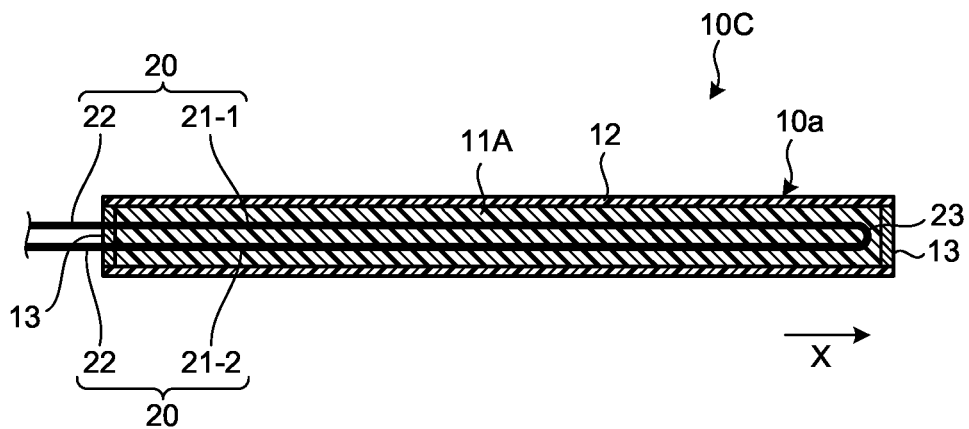
FIG. 5 is an exemplary schematic configuration diagram of a sensing cable of a third embodiment.

FIG. 5 is a cross-section taken along a longitudinal direction of a sensing cable 10C of a third embodiment. As illustrated in FIG. 5, in the present embodiment, the first optical fiber 21-1 and the second optical fiber 21-2 are constituted of a single optical fiber, and are connected through a turning portion 23. The optical fiber 20 is, for example, plastic optical fiber. In the configuration as described also, actions and effects similar to those of the first embodiment can be obtained.

Fourth Embodiment

Figure 6:
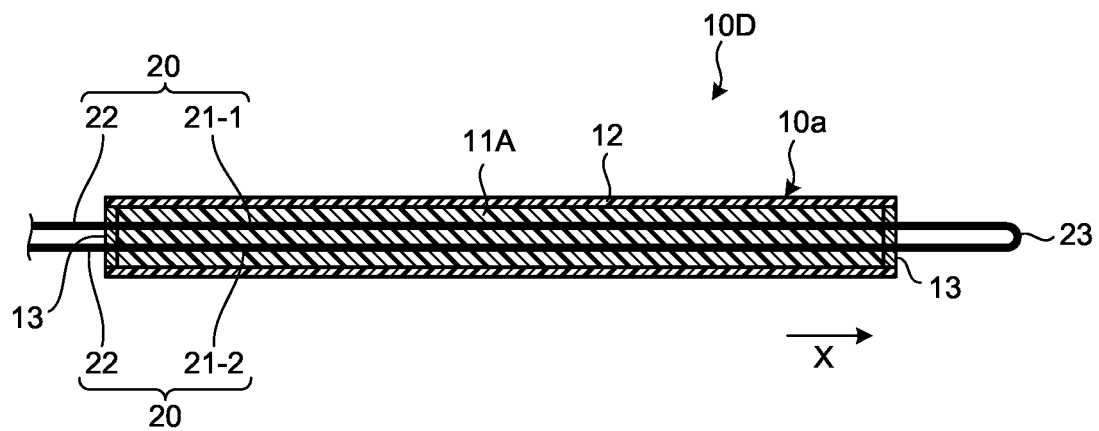
FIG. 6 is an exemplary schematic configuration diagram of a sensing cable of a fourth embodiment.

FIG. 6 is a cross-section taken along a longitudinal direction of a sensing cable 10D of a fourth embodiment. As illustrated in FIG. 6, in the present embodiment also, the first optical fiber 21-1 and the second optical fiber 21-2 are constituted of a single optical fiber, and are connected through the turning portion 23. However, in the present embodiment, the turning portion 23 is arranged at a position deviated from the measuring unit 10a. In the configuration as described also, actions and effects similar to those of the embodiments described above can be obtained. Moreover, according to the present embodiment, because an external force does not act on the turning portion 23, it is possible to prevent the leakage state of light from changing at the turning portion 23 as affected by an action of the external force, and prevent the change from affecting the reception light intensity at the light receiving unit 32. Therefore, according to the present embodiment, the measurement accuracy can be further improved.

Fifth Embodiment

Figure 7:
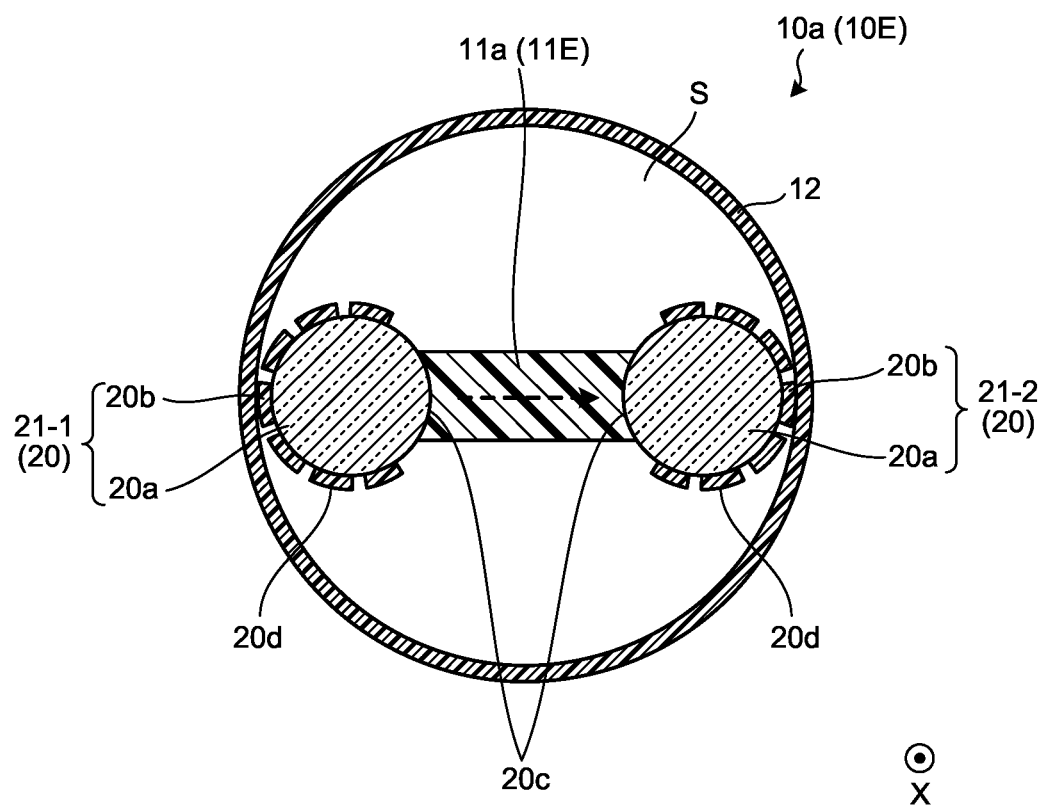
FIG. 7 is an exemplary and schematic cross-section of a sensing cable of a fifth embodiment.
Figure 8:
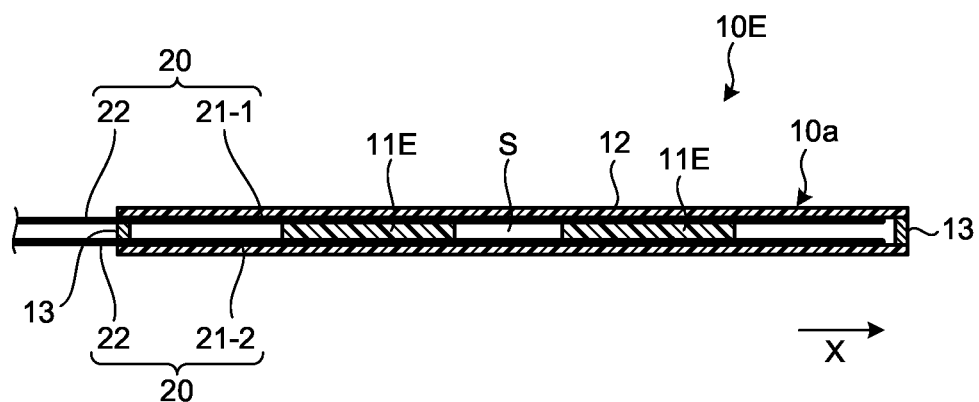
FIG. 8 is an exemplary schematic configuration diagram of a sensing cable of the fifth embodiment.

FIG. 7 is a cross-section intersecting a longitudinal direction of the measuring unit 10a of a sensing cable 10E of a fifth embodiment, and FIG. 8 is a cross-section taken along a longitudinal direction of the sensing cable 10E.

As illustrated in FIG. 7, in the present embodiment, a transmitting material 11E is present only between the first optical fiber 21-1 and the second optical fiber 21-2. That is, the transmitting material 11E only includes the intervention portion 11a. Furthermore, inside the cover 12, that is, between the first optical fiber 21-1, the second optical fiber 21-2, and the transmitting material 11E, and the cover 12, a housing chamber S is formed. In the housing chamber S, for example, an inactive gas such as nitrogen, or a gas such as air is put. In this case, the refractive index of the gas put in the housing chamber S is lower than the refractive index of the core 20a of the first optical fiber 21-1, the refractive index of the core 20a of the second optical fiber 21-2, and the refractive index of the transmitting material 11E.

The outer periphery of the first optical fiber 21-1 and the second optical fiber 21-2 have the portion 20c and a portion 20d. In the portion 20c, the cladding 20b is removed, and core 20a faces and is in contact with the intervention portion 11a. Moreover, in the portion 20d, the first optical fiber 21-1 and the second optical fiber 21-2 are separated from the intervention portion 11a, that is, the transmitting material 11E. In at least a part of the portion 20d, the cladding 20b is arranged. In the configuration as described, the inspection light leaked from the first optical fiber 21-1 is not to leak to the housing chamber S through the portion 20d or the cladding 20b, but is coupled with the intervention portion 11a through the portion 20c, and eventually with the second optical fiber 21-2. Therefore, according to the present embodiment also, the inspection light leaked from the first optical fiber 21-1 can be efficiently transferred to the second optical fiber 21-2 through the intervention portion 11a, and the detection sensitivity and the energy efficiency can be improved in measurement of an external force and a state change by the sensing system 100. The portion 20c is one example of a first section, and the portion 20d is one example of a second section.

Moreover, as illustrated in FIG. 8, in the present embodiment, the transmitting material 11E extends in the longitudinal direction of the measuring unit 10a. Furthermore, the transmitting material 11E is arranged not across the entire section, but in a part of the measuring unit 10a in the longitudinal direction, and is distributed so as to be separated from one another at a plurality of positions in the longitudinal direction. In this case, for example, by outputting the inspection light as optical pulse, and by adopting a technique of optical time-domain reflectometry (OTDR), it becomes possible to identify a position at which an external force acts in the measuring unit 10a, and a position at which the transmitting material 11E affected by an external force is arranged, based on a time waveform of the reception light intensity in the light receiving unit 32.

Sixth Embodiment

Figure 9:
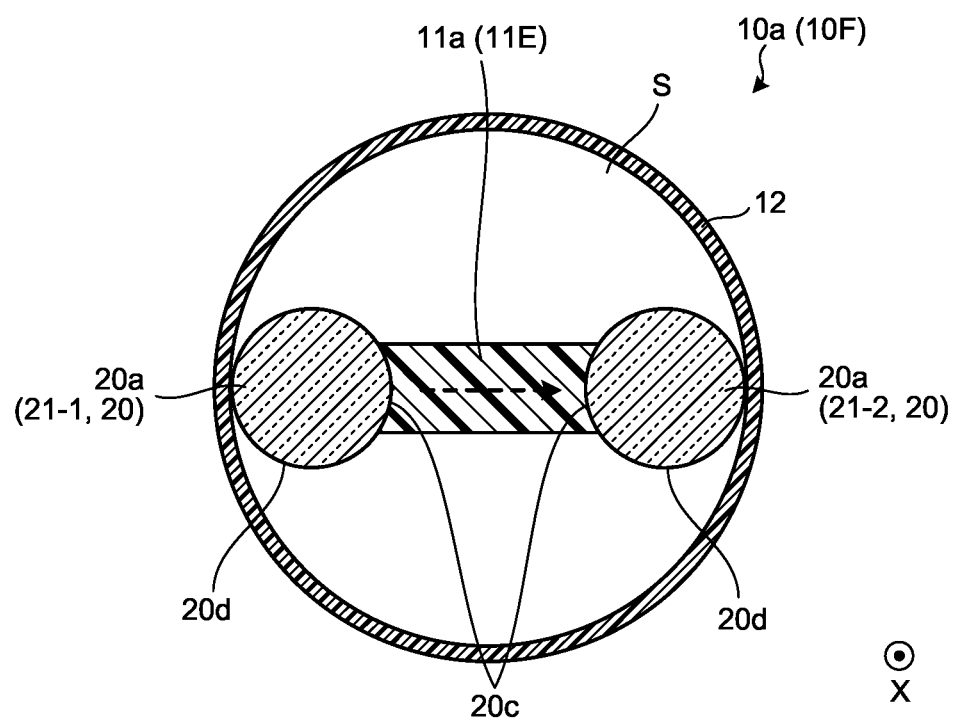
FIG. 9 is an exemplary and schematic cross-section of a sensing cable of a sixth embodiment.

FIG. 9 is a cross-section intersecting a longitudinal direction of the measuring unit 10a of a sensing cable 10F of a sixth embodiment. As illustrated in FIG. 9, in the present embodiment, along with the first optical fiber 21-1 and the second optical fiber 21-2, at least in the measuring unit 10a, the cladding 20b is not provided. As described above, the refractive index of the gas in the housing chamber S is lower than the refractive index of the first optical fiber 21-1, the second optical fiber 21-2, and the transmitting material 11E. Moreover, the refractive index of the cover 12 is also lower than the refractive index of the first optical fiber 21-1, the second optical fiber 21-2, and the transmitting material 11E. Accordingly, also in the configuration without the cladding 20b as the present embodiment, the inspection light leaked from the first optical fiber 21-1 does not leak to the housing chamber S or the cover 12 from the portion 20d, and is coupled with the intervention portion 11a through the portion 20c, and eventually with the second optical fiber 21-2. Therefore, according to the present embodiment also, the inspection light leaked from the first optical fiber 21-1 can be transferred more efficiently to the second optical fiber 21-2 through the intervention portion 11a, and the detection sensitivity and the energy efficiency can be improved in measurement of an external force and a state change by the sensing system 100.

Seventh Embodiment

Figure 10:
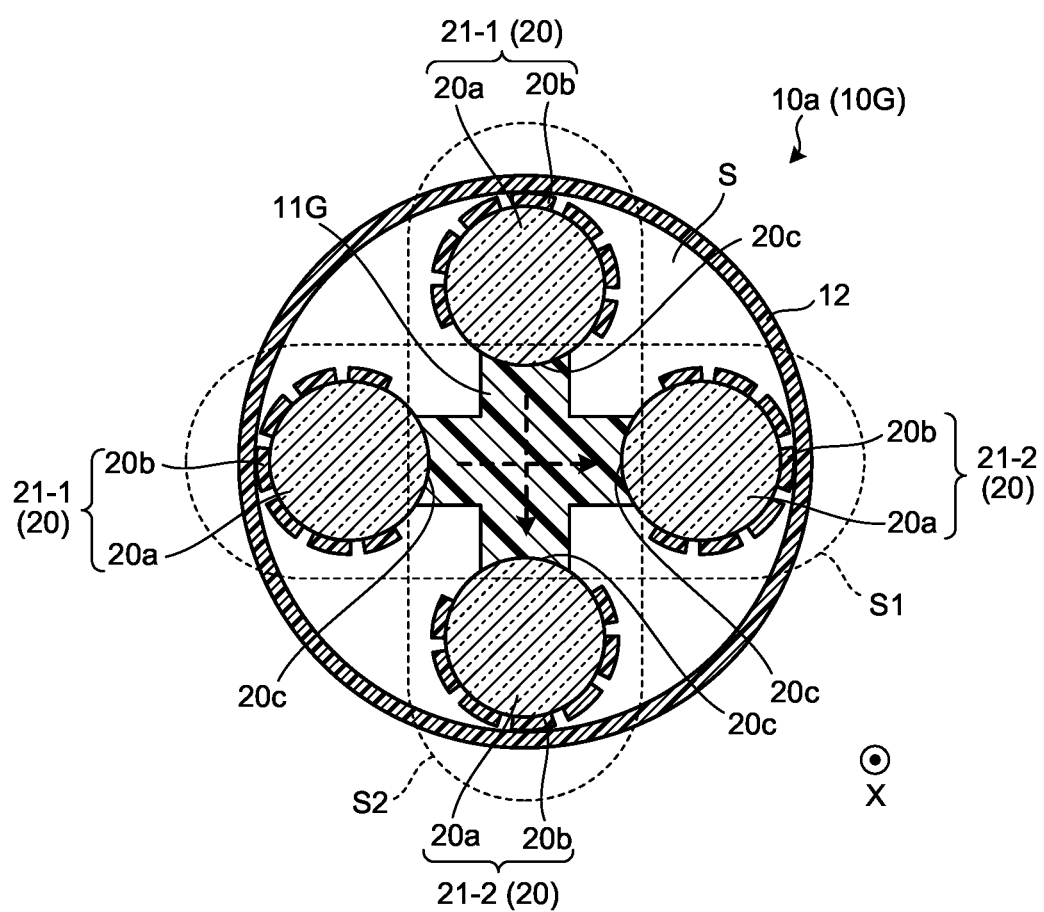
FIG. 10 is an exemplary and schematic cross-section of a sensing cable of a seventh embodiment.

FIG. 10 is a cross-section intersecting a longitudinal direction of the measuring unit 10a of a sensing cable 10G of a seventh embodiment. As illustrated in FIG. 10, in the present embodiment, the sensing cable 10G includes plural sets S1, S2 that respectively include the first optical fiber 21-1 and the second optical fiber 21-2 positioned so as to sandwich the intervention portion 11a of a transmitting material 11G, similarly to the fifth embodiment. By thus providing a plurality of pieces of the sets S1, S2, benefits, for example, that of a double measurement system can be established, or that an error or variation of measurement can be suppressed by calculating an average value based on respective measurement values of the two sets S1, S2 can be produced.

As illustrated in FIG. 10, in the present embodiment, the transmitting material 11G is shared by the plural sets S1, S2. The configuration as described is beneficial in that time and effort in manufacturing and cost can be reduced by reducing the number of parts, and in that the measuring unit 10a can be formed in a compact size, compared to a configuration in which the plural sets S1, S2 respectively have independent pieces of the transmitting material 11G.

Moreover, as illustrated in FIG. 10, in the present embodiment, directions in which the first optical fiber 21-1 and the second optical fiber 21-2 are aligned in the plural sets S1, S2 intersect with each other. According to the configuration as described, benefits, for example, that a direction in which an external force acts, and a direction of a state change caused in the sensing cable 10G can be measured based on respective measurement values of the plural sets S1, S2 can be produced.

Eighth Embodiment

Figure 11:
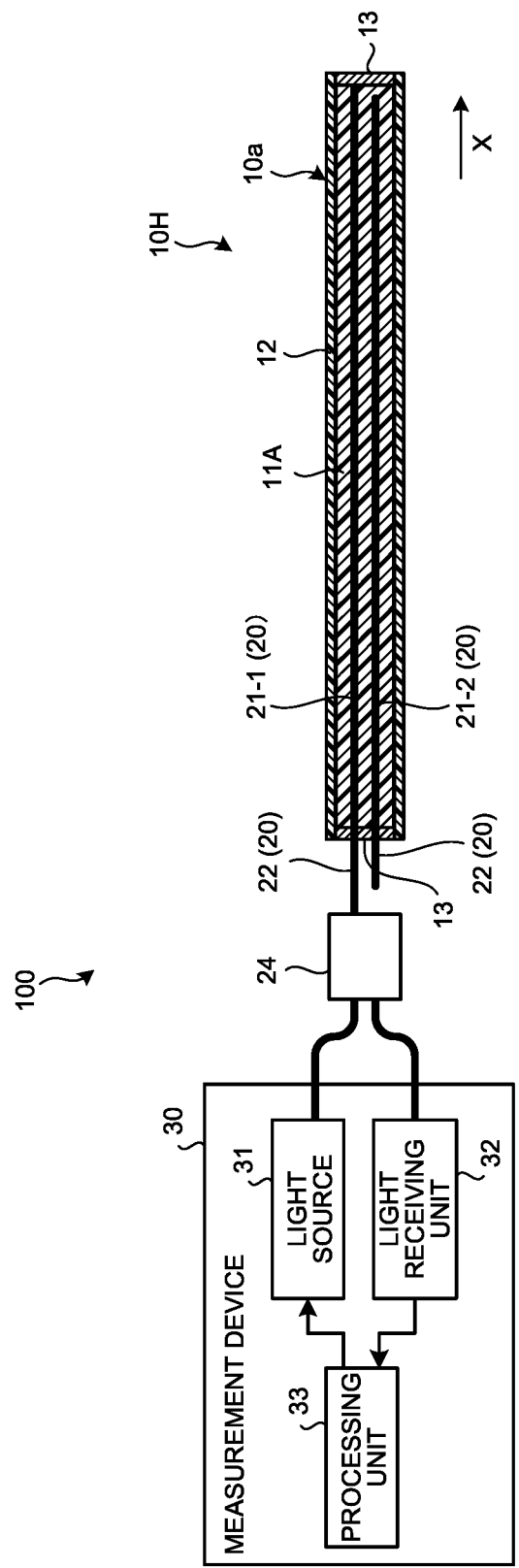
FIG. 11 is an exemplary schematic configuration diagram of a sensing cable of an eighth embodiment.

FIG. 11 is a schematic configuration diagram of the sensing system 100 including a sensing cable 10H of an eighth embodiment. In FIG. 11, as for the sensing cable 10H, a cross-section taken along a longitudinal direction is illustrated.

As illustrated in FIG. 11, in the present embodiment, the light source 31 and the light receiving unit 32 are optically connected to a coupler 24 through the delivery optical fiber 22. Moreover, the coupler 24 optically connects two pieces of the delivery optical fibers and the first optical fiber 21-1. In this configuration, the inspection light output from the light source 31 is input to the first optical fiber 21-1 through the delivery optical fiber 22 and the coupler 24, is reflected on an end portion on the opposite side to the light source 31 in the first optical fiber 21-1, and is input to the light receiving unit 32 through the coupler 24 and the other delivery optical fiber 22. When an external force acts on the measuring unit 10a, the inspection light leaked from the first optical fiber 21-1 is transmitted to the second optical fiber 21-2 through the transmitting material 11A, and the light reception intensity in the light receiving unit 32 decreases for the corresponding amount. Therefore, according to the configuration of the present embodiment also, an external force acting on the sensing cable 10H, or an amount of state change of the sensing cable 10A can be measured based on the reception light intensity in the light receiving unit 32. In the first to the seventh embodiments described above, an external force and a state change measured become larger as the reception light intensity increases, but in the present embodiment, an external force and a state change measured become larger as the reception light intensity decreases.

As above, the embodiments of the present disclosure have been exemplified, the above embodiments are one example, and are not intended to limit the scope of the present disclosure. The above embodiments can be implemented in various other forms, and various omission, replacement, combination, and change are possible in a range not departing from the gist of the present disclosure. Moreover, respective configurations, specifications such as shapes (structure, type, direction, model, size, length, width, thickness, height, quantity, arrangement, position, material, and the like) can be appropriately changed to be implemented.

For example, when refractive indexes of the first optical fiber, the transmitting material (intervention portion), and the second optical fiber are set to be substantially the same and a configuration in which the first optical fiber, the transmitting material, and the second optical fiber are substantially symmetrical with respect to the transmitting material is provided, by optically connecting the light source and the second optical fiber, and by optically connecting the light receiving unit and the first optical fiber, measurement can be performed by switching the first optical fiber and the second optical fiber.

According to the present disclosure, for example, improved and novel sensing cable and sensing system can be obtained.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A sensing cable comprising:
    a first optical fiber;
    a second optical fiber that extends along the first optical fiber and that is spaced from the first optical fiber; and
    a transmitting material including an intervention portion present between the first optical fiber and the second optical fiber, the transmitting material being configured to transmit light from the first optical fiber to the second optical fiber through the intervention portion, wherein
    on a cross-section intersecting a longitudinal direction of the first optical fiber at a position at which the intervention portion is arranged, an outer periphery of the first optical fiber includes a first section and a second section, the first section being in contact with the intervention portion and being optically connected to the intervention portion, the second section being separated from the intervention portion.

2. The sensing cable according to claim 1, further comprising
    a suppression material configured to suppress travel of light from the first optical fiber to a direction deviating from the intervention portion on the outer periphery of the first optical fiber.

3. The sensing cable according to claim 2, wherein
    the suppression material is made from a synthetic resin material.

4. The sensing cable according to claim 1, wherein
    a transmission loss of an inspection light of the first optical fiber at an inspection wavelength is 0.3 dB/m or more.

5. The sensing cable according to claim 1, wherein
    the first optical fiber and the second optical fiber are configured to transmit an inspection light at an inspection wavelength in a multimode.

6. The sensing cable according to claim 1, further comprising
    a tubular cover surrounding the first optical fiber and the second optical fiber.

7. The sensing cable according to claim 6, wherein
space in which a gas is put is arranged between the first optical fiber, the second optical fiber, and the transmitting material, and the tubular cover.

8. The sensing cable according to claim 1, wherein
a refractive index of the transmitting material is equal to or higher than a refractive index of a core of the first optical fiber and is equal to or lower than a refractive index of the second optical fiber.

9. The sensing cable according to claim 1, wherein
a refractive index of the transmitting material is higher than a refractive index of a core of the first optical fiber and is lower than a refractive index of the second optical fiber.

10. The sensing cable according to claim 1, wherein
a refractive index of the transmitting material is substantially the same as a refractive index of a core of the first optical fiber and a refractive index of the second optical fiber.

11. The sensing cable according to claim 1, wherein
the first optical fiber and the second optical fiber are made from a synthetic resin material.

12. The sensing cable according to claim 1, wherein
the first optical fiber and the second optical fiber are made from quartz glass.

13. The sensing cable according to claim 1, wherein
the transmitting material is made from a synthetic resin material.

14. The sensing cable according to claim 1, wherein
the first optical fiber and the second optical fiber are a single optical fiber and are connected through a turning portion.

15. The sensing cable according to claim 14, wherein
the turning portion is positioned to be deviated in a longitudinal direction of the sensing cable with respect to the transmitting material.

16. The sensing cable according to claim 1, wherein
the first optical fiber and the second optical fiber are arranged in a separated manner from each other.

17. The sensing cable according to claim 1, further comprising:
a plurality of sensing sets, each sensing set including the transmitting material and the first optical fiber and the second optical fiber positioned with the intervention portion sandwiched between the first optical fiber and the second optical fiber.

18. The sensing cable according to claim 17, wherein
the plurality of sensing sets include sensing sets that share the transmitting material.

19. The sensing cable according to claim 18, wherein
in the sensing sets that share the transmitting material, directions in which the first optical fiber and the second optical fiber are aligned intersect with each other.

20. A sensing system comprising:
a light source;
the sensing cable according to claim 1; and
a measurement device configured to measure at least one of an external force acting on the sensing cable and a state change of the sensing cable based on inspection light, the inspection light being input to the first optical fiber from the light source and being output from the second optical fiber through the transmitting material.

21. The sensing system according to claim 20, wherein
a wavelength of the inspection light is equal to or longer than 400 nm and equal to or shorter than 550 nm.

22. The sensing system according to claim 20, wherein
the inspection light is an optical pulse.

* * * * *